(12) United States Patent
Boesch et al.

(10) Patent No.: US 9,243,570 B2
(45) Date of Patent: Jan. 26, 2016

(54) AUTO-STOP CONTROL FOR A STOP/START VEHICLE AT A SERVICE LOCATION

(71) Applicant: FORD GLOBAL TECHNOLOGIES, LLC, Dearborn, MI (US)

(72) Inventors: Mathew Alan Boesch, Plymouth, MI (US); Sangeetha Sangameswaran, Canton, MI (US); John Anthony Lockwood, Canton, MI (US); George Edmund Walley, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 15 days.

(21) Appl. No.: 14/053,722

(22) Filed: Oct. 15, 2013

(65) Prior Publication Data

US 2014/0257679 A1  Sep. 11, 2014

Related U.S. Application Data

(63) Continuation-in-part of application No. 13/793,570, filed on Mar. 11, 2013.

(51) Int. Cl.
*F02D 17/04* (2006.01)

(52) U.S. Cl.
CPC .................................. *F02D 17/04* (2013.01)

(58) Field of Classification Search
CPC ....................................................... F02D 17/04
USPC ..................... 123/179.3, 179.4; 701/107, 112
See application file for complete search history.

(56) References Cited

U.S. PATENT DOCUMENTS

| | | | |
|---|---|---|---|
| 5,629,689 A | 5/1997 | Curwood | |
| 5,745,581 A | 4/1998 | Eatwell et al. | |
| 6,675,094 B2 | 1/2004 | Russell et al. | |
| 6,900,740 B2 | 5/2005 | Bloomquist et al. | |
| 6,941,218 B2 * | 9/2005 | Wolf et al. | 701/112 |
| 7,349,797 B2 * | 3/2008 | Donnelly et al. | 701/115 |
| 7,650,864 B2 * | 1/2010 | Hassan et al. | 123/179.2 |
| 7,681,546 B2 | 3/2010 | Lecole et al. | |
| 8,095,291 B2 * | 1/2012 | Christen et al. | 701/102 |
| 8,498,802 B2 | 7/2013 | Yamamoto | |
| 8,532,843 B2 * | 9/2013 | Nagura et al. | 701/2 |
| 8,594,912 B2 * | 11/2013 | Weaver | 701/112 |
| 8,904,984 B2 * | 12/2014 | Hanft et al. | 123/179.4 |
| 2005/0239436 A1 | 10/2005 | Bell et al. | |

(Continued)

FOREIGN PATENT DOCUMENTS

| DE | 3019709 A1 | 6/1980 |
|---|---|---|
| JP | 2004232557 A2 | 8/2004 |
| JP | 2006057456 A2 | 3/2006 |

OTHER PUBLICATIONS

Office Action mailed Dec. 31, 2014, U.S. Appl. No. 13/793,570, filed Mar. 11, 2013.

(Continued)

*Primary Examiner* — Hieu T Vo
*Assistant Examiner* — Arnold Castro
(74) *Attorney, Agent, or Firm* — David B. Kelley; Brooks Kushman P.C.

(57) ABSTRACT

A stop/start vehicle includes an engine and a stop/start system that prevents an auto stop of the engine when the speed of the vehicle is approximately zero in response to the vehicle being located at a service location or in response to the vehicle being located in a user identified geographic region.

16 Claims, 3 Drawing Sheets

(56) References Cited

U.S. PATENT DOCUMENTS

| | | | |
|---|---|---|---|
| 2006/0277495 A1* | 12/2006 | Obradovich | 715/790 |
| 2009/0171547 A1 | 7/2009 | Hyde et al. | |
| 2010/0070128 A1 | 3/2010 | Johnson | |
| 2010/0125402 A1 | 5/2010 | Bansal et al. | |
| 2010/0168992 A1* | 7/2010 | Nakata | 701/112 |
| 2011/0005486 A1* | 1/2011 | Nakamura | 123/179.4 |
| 2013/0035839 A1* | 2/2013 | Otanez et al. | 701/102 |
| 2014/0081561 A1 | 3/2014 | Be et al. | |
| 2014/0257678 A1* | 9/2014 | Boesch et al. | 701/112 |

OTHER PUBLICATIONS

Final Office Action dated Sep. 4, 2015 in U.S. Appl. No. 14/053,637, filed Oct. 15, 2013.

* cited by examiner

AUTO-STOP CONTROL FOR A STOP/START VEHICLE AT A SERVICE LOCATION

CROSS-REFERENCE TO RELATED APPLICATION

This application is a continuation-in-part of Application Ser. No. 13/793,570, filed Mar. 11, 2013, the contents of which are incorporated by reference herein.

TECHNICAL FIELD

This disclosure relates to stop/start vehicles and controlling stop/start activities while the vehicle is situated at a service location.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A stop/start vehicle includes an engine and a stop/start system that prevents an auto stop of the engine when the speed of the vehicle is approximately zero in response to the vehicle being located within a user identified geographic region. The user identified geographic region may be a service location. The user identified geographic region may alternatively be a vehicle sales outlet. The vehicle location within the user identified geographic region may be detected using at least one of WiFi and cellular data communication. The vehicle location within the user identified geographic region may, in another embodiment, be detected using at least one of RFID tags, magnetic strips, and optical recognition of barcodes or QR Codes®. The vehicle location within the user identified geographic region may, in yet another embodiment, be detected using at least one of GPS and aGPS systems. The stop/start system may be further programmed to override the auto stop prevention in response to an application of a stop/start system diagnostic tool.

A stop/start vehicle may be controlled to prevent an auto stop of an engine when a speed of the vehicle is approximately zero in response to the vehicle being located at a service station. Detecting the vehicle location at the service location may comprise comparing a detected vehicle location against a database of service locations. Detecting the vehicle location at the service location may, in another embodiment, comprise detecting a vehicle location within a user identified geofence. The user identified geofence may include a user selectable radius. The stop/start vehicle may be further controlled to override the auto stop prevention in response to an application of a stop/start system diagnostic tool.

A stop/start vehicle includes an engine and a stop/start system that prevents an auto stop of the engine when the speed of the vehicle is approximately zero in response to the vehicle being located at a service location. Detecting the vehicle location at the service location may comprise comparing a detected vehicle location against a database of service locations. Detecting the vehicle location at the service location may, in another embodiment, comprise detecting a vehicle location within a user identified geofence. The user identified geofence may include a user selectable radius. The stop/start vehicle may in various embodiments be controlled to detect the vehicle location using GPS, aGPS, WiFi, cellular data communication, RFID tags, magnetic strips, and/or optical recognition of barcodes or QR Codes®. The stop/start vehicle may be further controlled to override the auto stop prevention in response to an application of a stop/start system diagnostic tool.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with stop/start systems controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
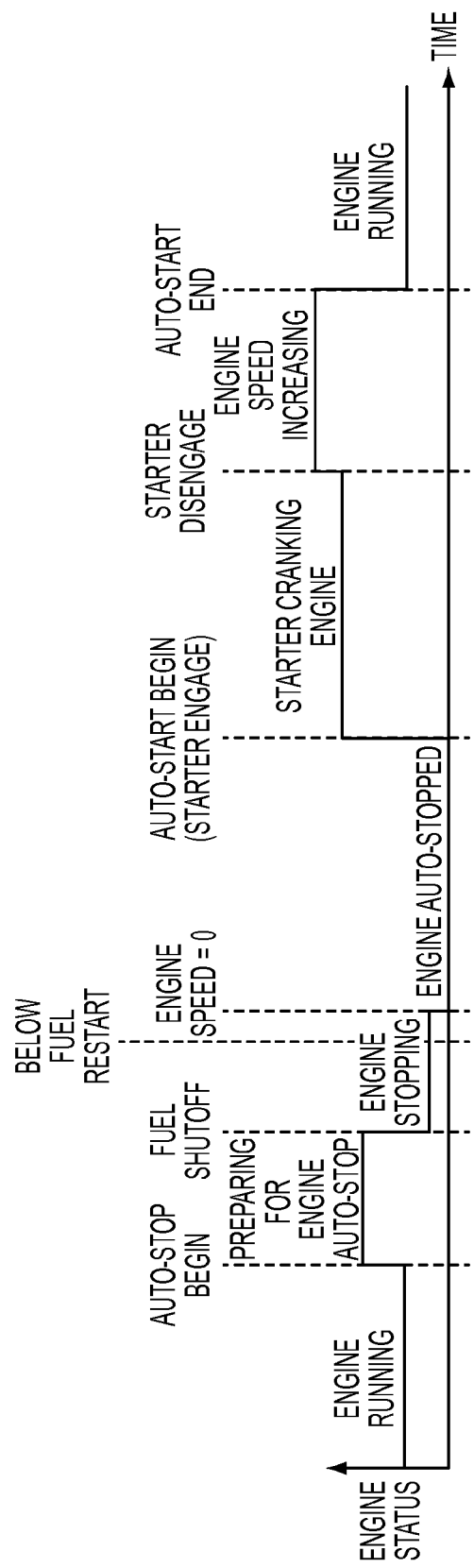
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In stop/start vehicles, the stop/start system may automatically shut down the engine in order to save fuel, and at a later time automatically restart the engine. In certain situations, however, it is undesirable for the engine to automatically stop. For example, when the vehicle is being manufactured or serviced, it may be desirable for the engine to continue running while the vehicle is stopped for purposes of testing or diagnosis. Similarly, if the vehicle is located at a sales outlet, it may be desirable for the engine to continue running while the vehicle is stopped in order for a potential customer to evaluate the vehicle.

Certain systems and methods disclosed herein may provide an improved stop/start control configuration for an engine having auto-stop functionality. A controller may utilize inputs from a variety of sensors to determine, for example, whether the vehicle is located at a sales outlet or a service location, such as a vehicle factory, an oil change station, a fueling station, or a car wash. If a determination is made that the vehicle is at such a location, the controller may prevent the engine from automatically shutting down.

Figure 2:
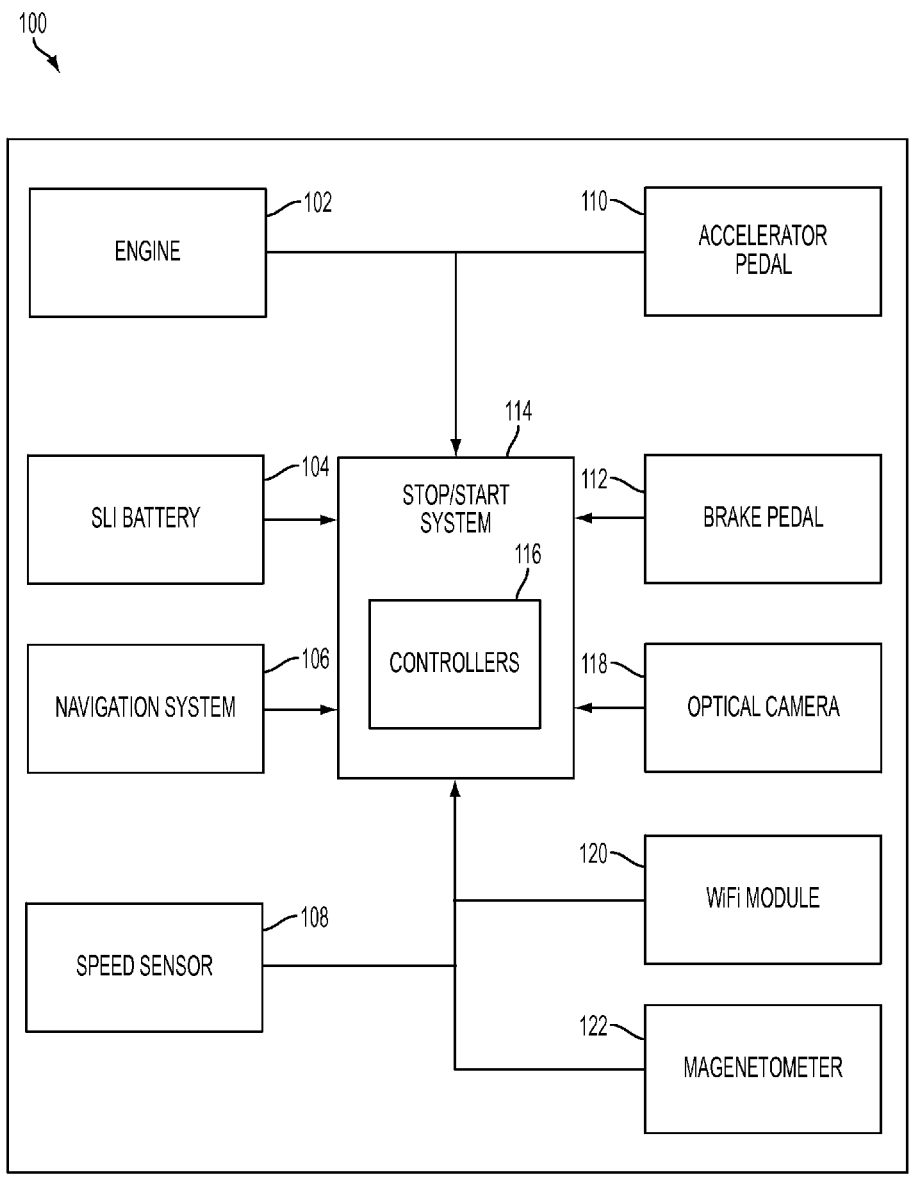
FIG. 2 is a block diagram of a stop/start vehicle.

With reference to FIG. 2, a schematic representation of a vehicle 100 having auto-stop functionality is shown. The vehicle 100 includes an engine 102, an SLI battery 104, a navigation system 106, a speed sensor 108, an accelerator pedal 110, and a brake pedal 112. The vehicle further includes a stop/start system 114 including at least one controller 116, an optical camera 118, a Wi-Fi module 120, and a magnetometer 122. The engine 102, SLI battery 104, navigation system 106, speed sensor 108, accelerator pedal 110, brake pedal 112, optical camera 118 Wi-Fi module 120, and magnetometer 122 are all in communication with or under the control of the stop/start system 114, as indicated by thin solid line. In one configuration, the navigation system 106 is an in-vehicle GPS or assisted GPS ("aGPS") system. aGPS systems utilize cellular communications data to improve the time to fix a location. In another configuration, the navigation system 106 may comprise a location-enabled mobile device such as a cellular phone or standalone GPS unit. Other configurations are, of course, also possible.

The at least one controller 116 may issue auto-stop commands and auto-start commands to the engine 102 during vehicle operation. The stop/start system 114, for example, comprises a base auto-stop/start logic that issues auto-stop commands and auto-start commands—to achieve, among other things, stages similar to that described with reference to FIG. 1—based on signals from at least the speed sensor 108, accelerator pedal 110, and brake pedal 112. In short, the engine 102 will be shut down in response to an auto-stop command and will be restarted in response to an auto-start command.

Figure 3:
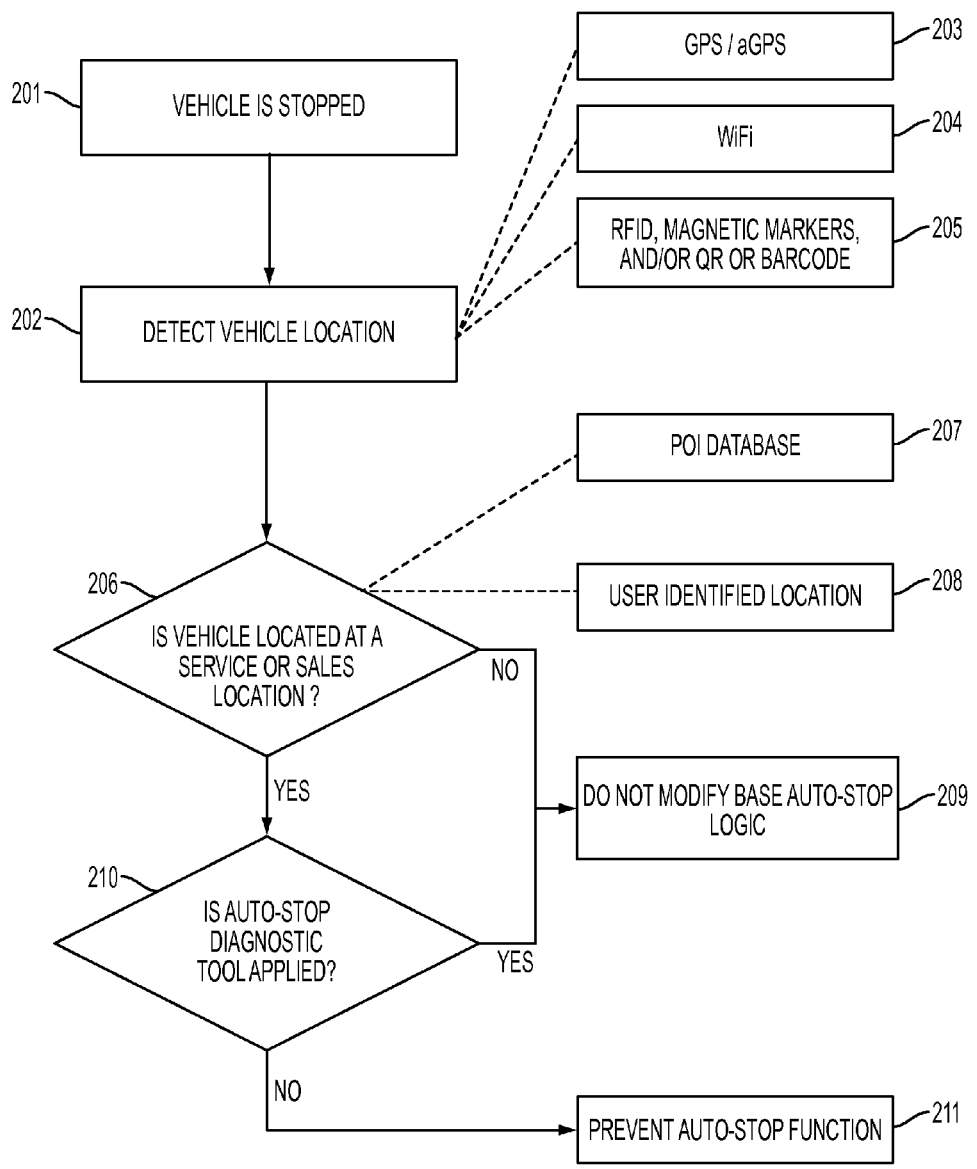
FIG. 3 is a flowchart illustrating an algorithm for controlling a start/stop vehicle.

In one embodiment described with reference to FIGS. 2 and 3, the vehicle 100 comes to a stop, as illustrated in block 201. The vehicle location is detected at block 202. This may be performed using a GPS or aGPS module, as illustrated at block 203. A GPS system may not acquire an adequate signal to fix a vehicle location within a building, so location information may be acquired using assisted GPS (aGPS) based upon cellphone service, potentially using a factory provided phone initialized to the factory location. Other systems may also be used. As an example, the vehicle might receive location information from in-plant WiFi, as illustrated at block 204. As another example, location information can be acquired using RFID tags and other "line-of-sight" technologies, such as magnetic strips and sensors, or on-board cameras or laser scanner recognition of environmental context clues in the form of barcodes or QR Codes®, as illustrated at block 205.

It is also determined whether the vehicle 100 is located in a service or sales location at block 206. As discussed above, a service location may include a vehicle factory, an oil change service station, a fueling station, a car wash, or other similar locations. The vehicle location at a service or sales location may be determined by comparing the detected vehicle location against a database of points of interest (POI), as illustrated at block 207. The POI database may include metadata for the POI entries indicating whether the POI is a service or sales location. The vehicle location at a service or sales location may also be determined by comparing the detected vehicle location against a database of user identified locations, as illustrated at block 208. If the determination is made that the vehicle is not located at a service or sales location, the base auto-stop logic is left unmodified at block 209. That is, the stop/start system 114 will control engine auto stops and auto starts based on vehicle speed and other relevant parameters following the processes described with reference to FIG. 1.

Returning to block 206, if yes, it is optionally determined whether an auto-stop diagnostic tool is applied at block 210. Such a tool may be connected to the vehicle to enable a technician to diagnose issues with the stop/start system. If yes, the base auto-stop logic is left unmodified at block 209, as above. If no, the auto-stop function is prevented as illustrated by block 211. That is, the engine 102 remains running.

In one example, a vehicle equipped with a stop/start system approaches a service station. The driver interacts with a navigation system and requests that the engine not auto-stop while near the present location. The effective area could default to a fixed radius from the current location or could toggle through a sequence of radii. This information is stored as a set of coordinates or as a geo-fence. Subsequently, one or more controllers detect vehicle location and compare it with a stored list of user-identified locations. If the detected location falls within one of the user-identified locations, the controllers may determine whether an auto-stop diagnostic tool is applied. Upon completing this protocol with a negative result, the controllers may inhibit any attempts to auto-stop the engine when vehicle speed is approximately zero.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As an example, one or both of blocks 210 and 211 may be omitted. In such embodiments, the auto-stop function may be prevented based on a determination that the vehicle is located within a service or sales location, and no evaluation is performed to determine whether an auto-stop diagnostic tool is applied.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A stop/start vehicle comprising:
    an engine; and
    a stop/start system programmed to prevent an auto stop of the engine when a speed of the vehicle is approximately zero in response to the vehicle being located within a user-identified-geographic region, the stop/start system being further programmed to auto stop the engine in response to an application of a stop/start system diagnostic tool.

2. The stop/start vehicle of claim 1, wherein the user-identified-geographic region is a service location.

3. The stop/start vehicle of claim 1, wherein the user-identified-geographic region is a vehicle-sales outlet.

4. The stop/start vehicle of claim 1, wherein the stop/start system is further programmed to detect whether the vehicle is located within the user-identified-geographic region using at least one of WiFi and cellular data communication.

5. The stop/start vehicle of claim 1, wherein the stop/start system is further programmed to detect whether the vehicle is located within the user-identified-geographic region using at least one of RFID tags, magnetic strips, and optical recognition of barcodes or other optically-detectable codes.

6. The stop/start vehicle of claim 1, wherein the stop/start system is further programmed to detect whether the vehicle is located within the user-identified-geographic region using at least one of GPS and aGPS.

7. The stop/start vehicle of claim 1, wherein the stop/start system is further programmed to compare a detected vehicle location against a user-identified geofence.

8. A method for controlling a stop/start vehicle comprising:
    detecting a location of the vehicle;
    preventing an auto stop of an engine of the vehicle when a speed of the vehicle is approximately zero in response to the vehicle being located at a service location; and
    auto stopping the engine in response to an application of a diagnostic tool.

9. The method of claim 8, wherein detecting a location of the vehicle includes comparing the location against a database of service locations.

10. The method of claim 8, wherein detecting a location of the vehicle includes comparing the location against a user-identified geofence.

11. The method of claim 10, wherein the user-identified geofence is defined by a user selectable radius.

12. A stop/start vehicle comprising:
    an engine; and
    a stop/start system programmed to compare a detected vehicle location against a user-identified geofence and prevent an auto stop of the engine when a speed of the vehicle is approximately zero in response to the vehicle being located at a service location, the stop/start system being further programmed to auto stop the engine in response to an application of a diagnostic tool.

13. The stop/start vehicle of claim 12, wherein the user-identified geofence is defined by a user selectable radius.

14. The stop/start vehicle of claim 12, wherein the stop/start system is further programmed to detect a vehicle location using at least one of GPS and aGPS.

15. The stop/start vehicle of claim 12, wherein the stop/start system is further programmed to detect a vehicle location using at least one of WiFi and cellular data communication.

16. The stop/start vehicle of claim 12, wherein the stop/start system is further programmed to detect a vehicle location using at least one of RFID tags, magnetic strips, and optical recognition of barcodes or other optically-detectable codes.

* * * * *